(12) United States Patent
Inoue

(10) Patent No.: US 9,185,243 B2
(45) Date of Patent: Nov. 10, 2015

(54) CONTROLLING RE-EXECUTION OF FACSIMILE TRANMISSION

(71) Applicant: CANON KABUSHIKI KAISHA, Tokyo (JP)

(72) Inventor: Katsuhiro Inoue, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/206,786

(22) Filed: Mar. 12, 2014

(65) Prior Publication Data

US 2014/0293365 A1 Oct. 2, 2014

(30) Foreign Application Priority Data

Mar. 29, 2013 (JP) ................................. 2013-074861

(51) Int. Cl.
  *H04N 1/00* (2006.01)
  *H04N 1/333* (2006.01)
(52) U.S. Cl.
  CPC ......... *H04N 1/0022* (2013.01); *H04N 1/00225* (2013.01); *H04N 1/33361* (2013.01)
(58) Field of Classification Search
  CPC ................... H04N 1/0022; H04N 2201/0025; H04N 2201/0093; H04N 1/333
  USPC .......................... 358/1.15, 442, 468; 455/557
  See application file for complete search history.

(56) References Cited

U.S. PATENT DOCUMENTS

| | | | | |
|---|---|---|---|---|
| 5,210,621 | A | * | 5/1993 | Kinoshita ..................... 358/440 |
| 6,256,382 | B1 | * | 7/2001 | Toda ......................... 379/355.01 |
| 2012/0166881 | A1 | * | 6/2012 | Nakayama ..................... 714/37 |

FOREIGN PATENT DOCUMENTS

JP 2012-134883 7/2012

* cited by examiner

*Primary Examiner* — Jacky X Zheng
(74) *Attorney, Agent, or Firm* — Fitzpatrick, Cella, Harper & Scinto

(57) ABSTRACT

A facsimile apparatus having a first interface that connects to an IP network and a second interface that connects to an analog network control, in the case where facsimile transmission using the first interface has failed, to execute re-transmission using the second interface when a communication mode used in that facsimile transmission is an automatically-selected communication mode, and not to execute re-transmission using the second interface when the communication mode used in the facsimile transmission is a manually-selected communication mode.

11 Claims, 7 Drawing Sheets

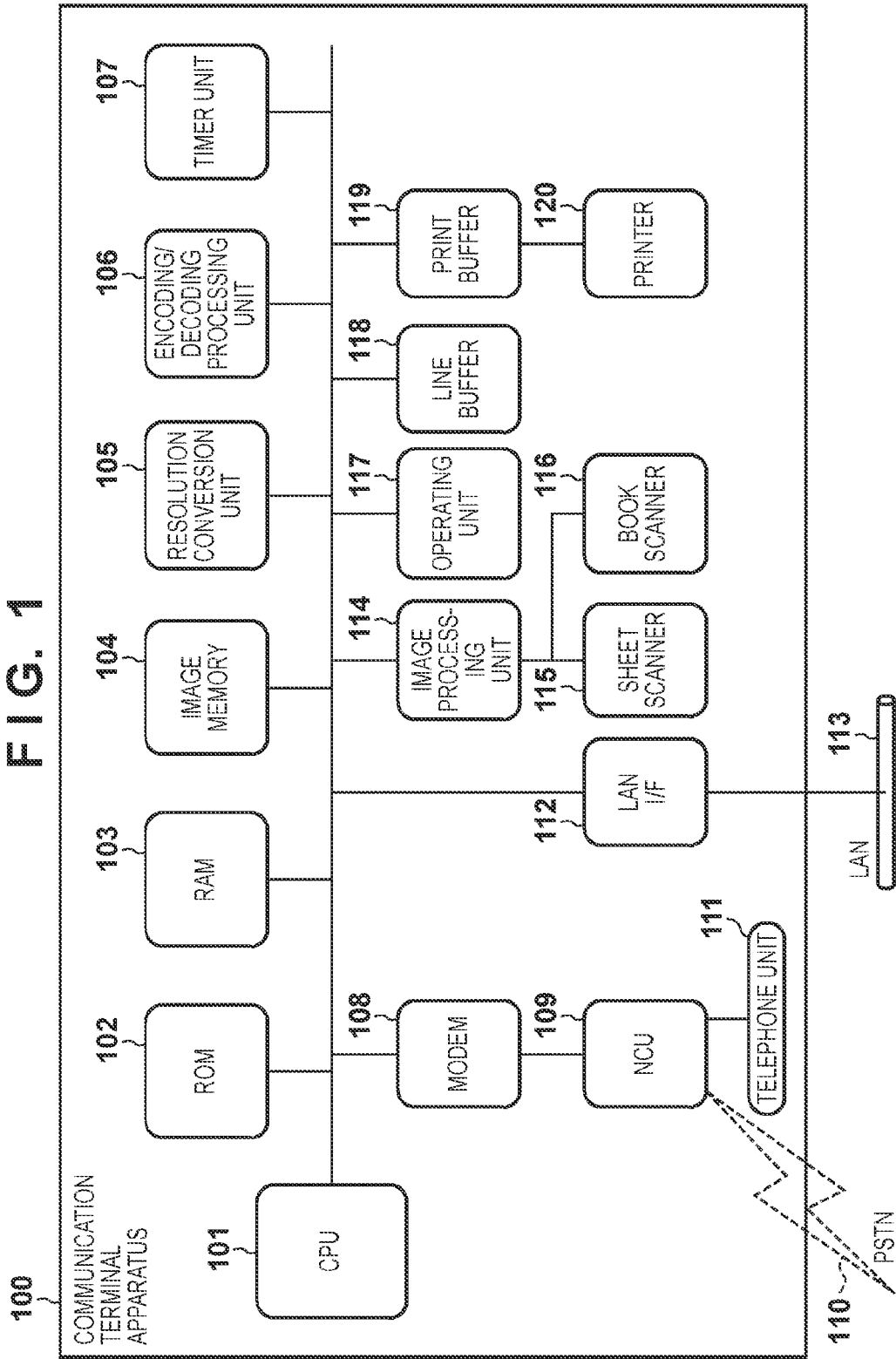

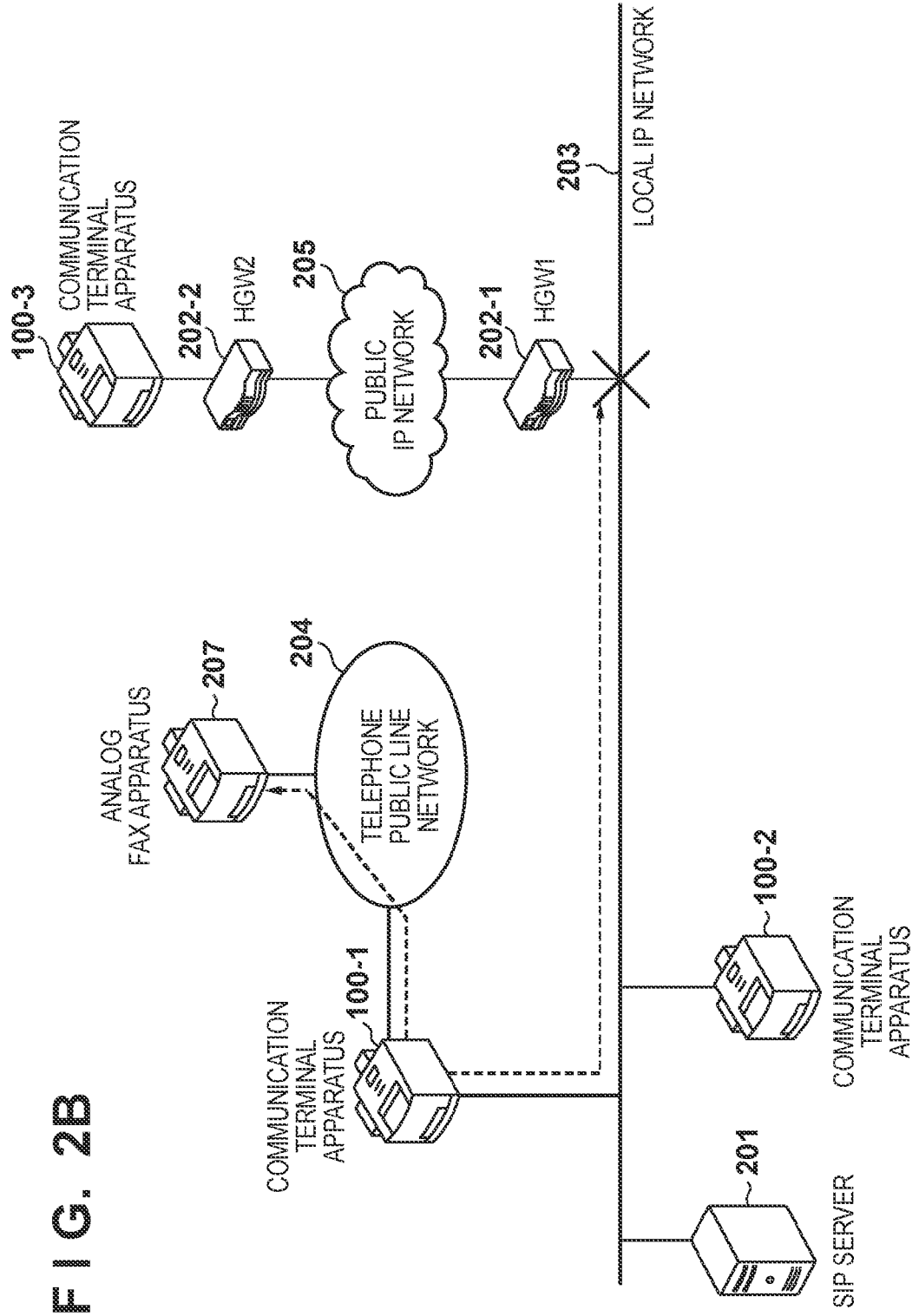

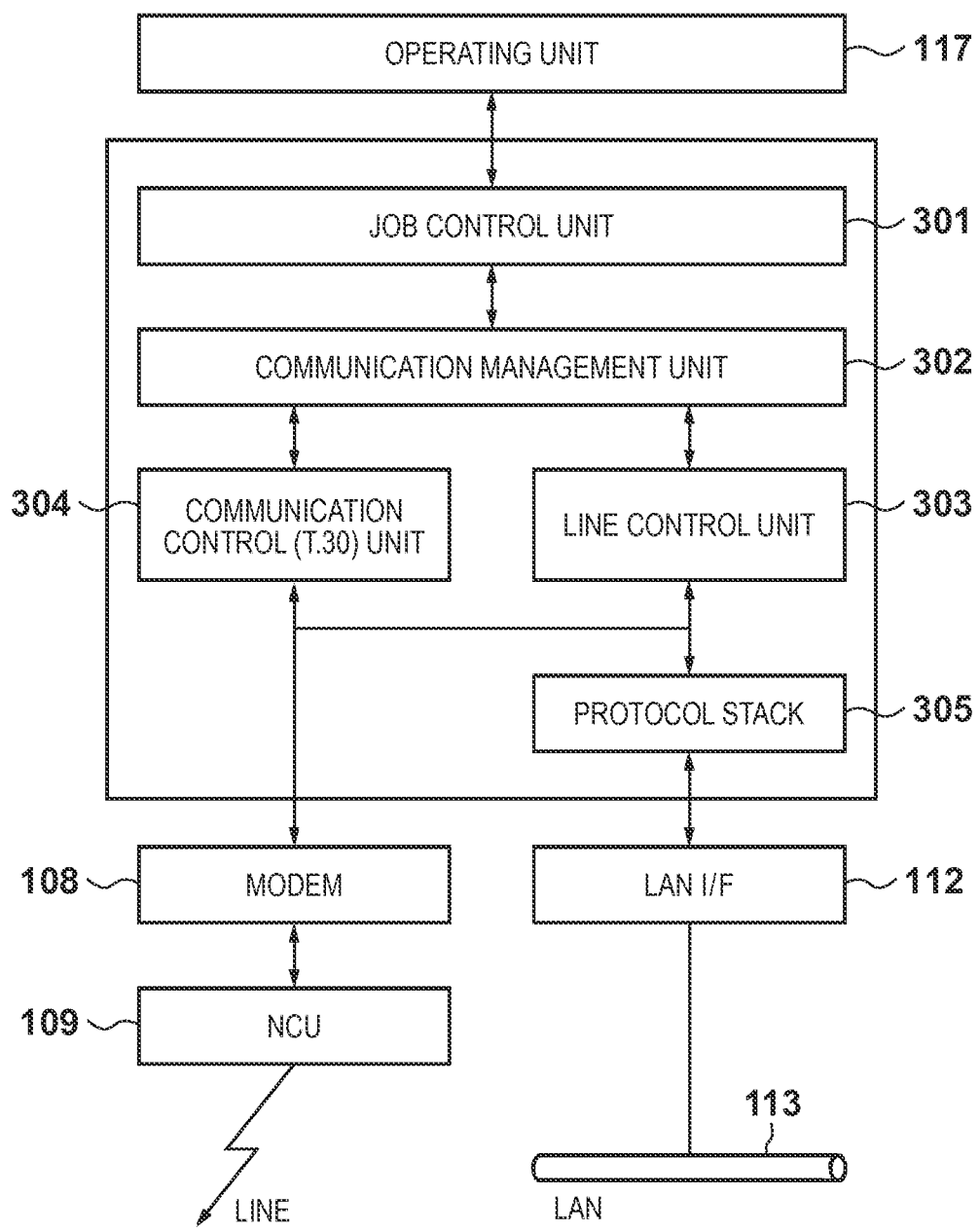

FIG. 4B

COMMUNICATION MODE AND TELEPHONE NUMBER PREFIX REGISTRATION SCREEN

TELEPHONE NUMBER PREFIX: 050

COMMUNICATION MODE:
- IP (LOCAL IP NETWORK VIA SIP SERVER)
- IP (NGN NETWORK VIA HGW)

[OK] [CANCEL]

COMMUNICATION MODE REGISTRATION LIST

| TELEPHONE NUMBER PREFIX | COMMUNICATION MODE |
|---|---|
| 626 | IP (LOCAL IP NETWORK VIA SIP SERVER) |
| 050 | IP (NGN NETWORK VIA HGW) |
| | |
| | |

CONTROLLING RE-EXECUTION OF FACSIMILE TRANMISSION

BACKGROUND OF THE INVENTION

1. Field of the Invention

The present invention relates to facsimile apparatuses that communicate over telephone public line networks and IP networks, control methods thereof, and storage medium.

2. Description of the Related Art

Recent years have seen the spread of communication terminal apparatuses connected to telephone public line networks such as Public Switched Telephone Networks (PSTN) as well as IP networks. Next Generation Networks (NGN) aimed at providing telephone and video communication services (called "public IP networks" hereinafter) have also begun to appear. Accordingly, communication terminal apparatuses that run on such NGNs are becoming more common. However, as shown in FIG. 2A, in the case where a plurality of networks are present in a given environment, users are unable to know what communication mode a given partner can be called through. Thus a technique is known in which an administrator creates a communication mode registration list, which associates prefixes of destination numbers with communication modes, in advance; when a user then inputs a partner telephone number, that number is compared with the registration list and the partner is called through the matching communication mode.

However, there are cases where communication errors occur even when this technique is employed. For example, the partner communication terminal may be an analog fax apparatus capable only of communication over a telephone public line network. In such a case, when a call is made over an IP network and a resulting communication error is detected, it is necessary to fall back on the telephone public line network. With the communication terminal apparatus disclosed in Japanese Patent Laid-Open No. 2012-134883, for example, a user may wish to communicate with an analog fax apparatus 207, but may be unaware that the partner device is an analog fax communication apparatus and may thus call the partner device through a public IP network, as illustrated in FIG. 2B. In this case, the communication terminal apparatus detects a communication error from a home gateway (HGW) and analyzes whether the detected communication error is an error requiring falling back on a telephone public line network or if the error does not require falling back. It is furthermore automatically determined whether to re-call over the IP network or re-call over the telephone public line network based on a result of the communication error analysis and a setting, made in the device in advance, for whether or not to execute fall-back processing for re-calling over the telephone public line network.

However, this conventional technique poses the following problem. The communication terminal apparatus in the above conventional technique will incur lower communication costs and will experience higher communication speeds when communicating over an IP network than when communicating over the telephone public line network, and thus users may prefer to avoid communicating over the telephone public line network. For example, a user may execute a transmission task having selected a communication mode in which the call is made over an IP network. However, in the case where a communication error occurs and a fall-back setting for re-calling over the telephone public line network is active as described above, there is a problem in that the re-call will be made over the telephone public line network in spite of the user's intent and desire to communicate over the IP network.

SUMMARY OF THE INVENTION

The present invention enables the realization of a scheme for executing appropriate re-transmission in accordance with a user's instruction in the case where a facsimile transmission using an interface connected to an IP network has failed.

One aspect of the present invention provides a facsimile apparatus having a first interface that connects to an IP network and a second interface that connects to an analog network, the apparatus comprising: a selection unit configured to automatically select a communication mode to be used from among a plurality of communication modes for transmission using the first interface; a transmission unit configured to execute facsimile transmission using the communication mode automatically selected by the selection unit in the case where an instruction has been made to automatically select the communication mode to be used and to execute facsimile transmission using a manually-selected communication mode in the case where one of the plurality of communication modes has been manually selected; and a control unit configured to control, in the case where facsimile transmission using the first interface has failed, to execute re-transmission using the second interface when the communication mode used in the facsimile transmission is the communication mode automatically selected by the selection unit, and not to execute re-transmission using the second interface when the communication mode used in the facsimile transmission is the manually-selected communication mode.

Another aspect of the present invention provides a facsimile apparatus having a first interface that connects to an IP network and a second interface that connects to an analog network, the apparatus comprising: an acceptance unit configured to accept an instruction for selecting a communication mode to be used from among a plurality of communication modes for transmission using the first interface; a transmission unit configured to execute facsimile transmission using the communication mode selected in accordance with the instruction accepted by the acceptance unit; and a control unit configured to control, in the case where facsimile transmission using the first interface has failed, to execute re-transmission using the second interface when the communication mode used in the facsimile transmission is a communication mode selected in accordance with a first instruction, and not to execute re-transmission using the second interface when the communication mode used in the facsimile transmission is a communication mode selected in accordance with a second instruction.

Still another aspect of the present invention provides a control method for a facsimile apparatus having a first interface that connects to an IP network and a second interface that connects to an analog network, the method comprising: automatically selecting a communication mode to be used from among a plurality of communication modes for transmission using the first interface; executing facsimile transmission using the communication mode automatically selected in the step of selecting in the case where an instruction has been made to automatically select the communication mode to be used and executing facsimile transmission using a manually-selected communication mode in the case where one of the plurality of communication modes has been manually selected; and controlling, in the case where facsimile transmission using the first interface has failed, to execute re-transmission using the second interface when the communication mode used in that facsimile transmission is the communication mode automatically selected in the step of selecting, and not to execute re-transmission using the second interface when the communication mode used in the facsimile transmission is the manually-selected communication mode.

Yet still another aspect of the present invention provides a control method for a facsimile apparatus having a first interface that connects to an IP network and a second interface that connects to an analog network, the method comprising: accepting an instruction for selecting a communication mode to be used from among a plurality of communication modes for transmission using the first interface; executing facsimile transmission using the communication mode selected in accordance with the instruction accepted in the step of accepting; and controlling, in the case where facsimile transmission using the first interface has failed, to execute re-transmission using the second interface when the communication mode used in the facsimile transmission is a communication mode selected in accordance with a first instruction, and not to execute re-transmission using the second interface when the communication mode used in the facsimile transmission is a communication mode selected in accordance with a second instruction.

Still yet another aspect of the present invention provides a non-transitory computer-readable storage medium storing a computer program that causes a computer to execute the steps of the control method for a facsimile apparatus.

Further features of the present invention will become apparent from the following description of an exemplary embodiment (with reference to the attached drawings).

BRIEF DESCRIPTION OF THE DRAWINGS

FIG. 1 is a block diagram illustrating the system configuration of a communication terminal apparatus 100 according to an embodiment.

FIGS. 2A and 2B are diagrams illustrating a network system configured using the communication terminal apparatus 100 and so on, according to the embodiment.

FIG. 3 is a software configuration diagram illustrating an application in the communication terminal apparatus 100 executing facsimile transmission, according to the embodiment.

FIG. 4B is a diagram illustrating the correspondence between number prefixes and communication modes, according to an embodiment.

DESCRIPTION OF THE EMBODIMENTS

Figure 2A:
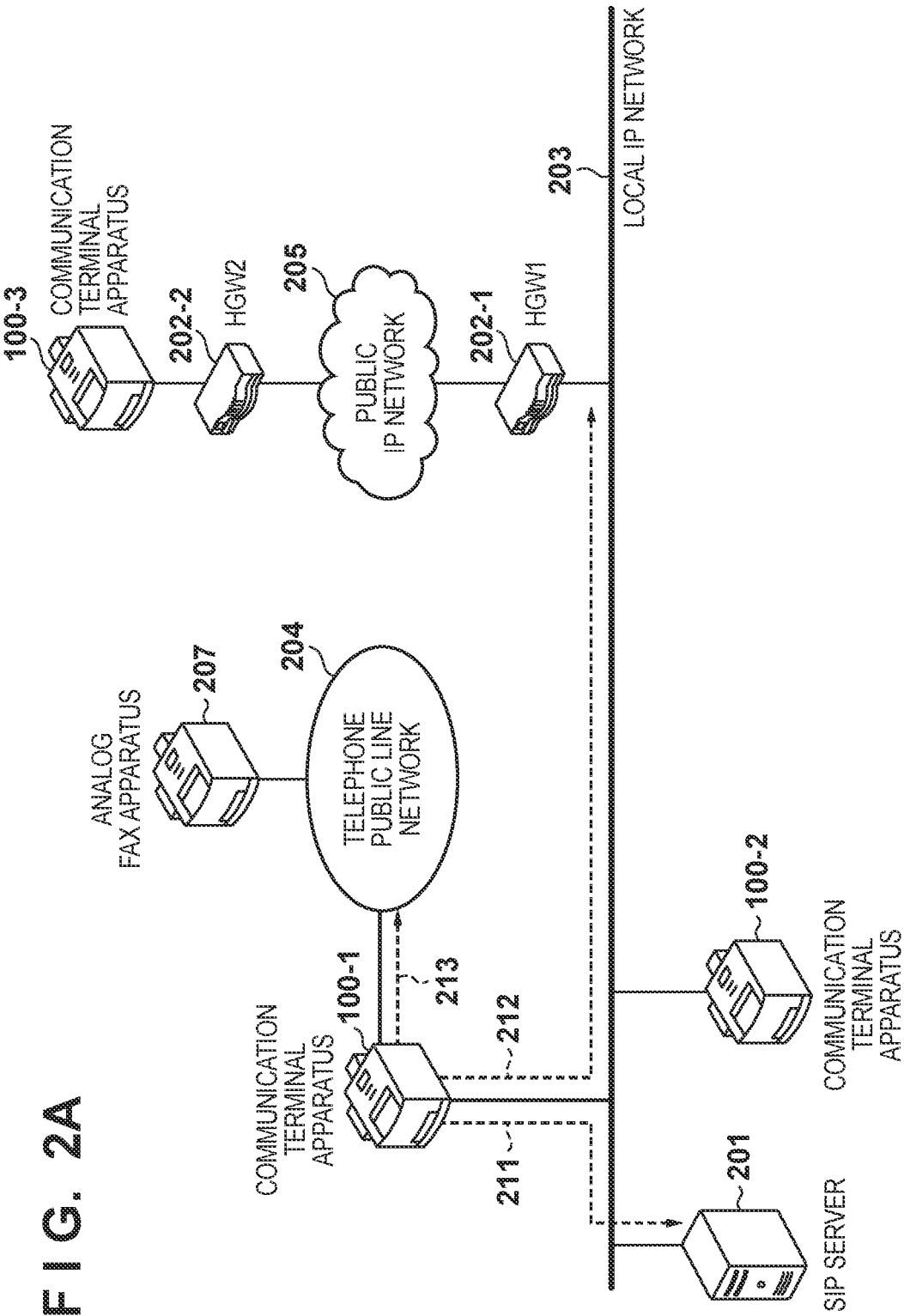

An embodiment of the present invention will now be described in detail with reference to the drawings. It should be noted that the relative arrangement of the components, the numerical expressions and numerical values set forth in this embodiment does not limit the scope of the present invention unless it is specifically stated otherwise.

First Embodiment

Configuration of Communication Terminal Apparatus

Hereinafter, an embodiment of the present invention will be described with reference to FIGS. 1 through 5. First, the configuration of a communication terminal apparatus 100, serving as a facsimile apparatus in the present embodiment, will be described with reference to FIG. 1. Although the present embodiment describes a facsimile apparatus as an example of the communication terminal apparatus, it should be noted that any apparatus capable of communicating with an external device in a plurality of communication modes may be used instead. For example, an image processing apparatus that has such communication functionality and processes image data sent/received using the communication functionality may be used. As shown in FIG. 1, the communication terminal apparatus 100 includes a CPU 101, a ROM 102, a RAM 103, an image memory 104, a resolution conversion unit 105, an encoding/decoding processing unit 106, a timer unit 107, a modem 108, an NCU 109, a LAN I/F 112, an image processing unit 114, a sheet scanner 115, a book scanner 116, an operating unit 117, a line buffer 118, a print buffer 119, and a printer 120. The CPU 101 is a system controller that controls the apparatus as a whole. The ROM 102 stores control programs executed by the CPU 101. The RAM 103 is used as a working memory when programs are executed. The image memory 104 is configured of a DRAM or the like, and is used for accumulating image data. The resolution conversion unit 105 executes resolution conversion control, such as millimeter-inch resolution conversion of raster data. The encoding/decoding processing unit (reading/recording codec) 106 executes encoding and decoding processes on image data handled by the communication terminal apparatus. The timer unit 107 measures operating intervals and the like, and is configured of an integrated chip or the like.

The modem 108 demodulates a modulated signal from a line, modulates a signal from the apparatus and sends the modulated signal to the line, and so on. The NCU 109 serves as an I/F with an analog line. A PSTN 110 is an analog line. A telephone unit 111 is used by a handset employed for voice conversations, a telephone answering machine, and so on. The LAN I/F 112 is used for network control. A LAN 113 indicates an IP network.

The image processing unit 114 carries out correction processing on image data read by a scanner and outputs high-resolution image data. The sheet scanner 115 and the book scanner 116 are configured of a CS image sensor, a document transport mechanism, and so on, and optically read documents and convert the resulting signals into electronic image data. Double-sided documents can also be read.

The operating unit 117 functions as an accepting unit, is configured of a keyboard, a display unit, and the like, and accepts user instructions when an operator makes various types of input operations. The operating unit 117 indicates that dialing operations can be carried out immediately when the handset is taken off the hook. Furthermore, when an external telephone unit is off the hook, the operating unit 117 displays an indication that communication is underway and that communication reservations can be accepted. The line buffer 118 is a line buffer used when controlling the transfer of image data. The print buffer 119 is a buffer memory that stores one page's worth of text code for printing. The printer 120 is a printer such as an LBP that records received images, file data, and the like onto standard paper, and can also execute double-sided recording.

Network Configuration

Next, the configuration of a network to which the communication terminal apparatus 100 is connected according to the present embodiment will be described with reference to FIGS. 2A and 2B. Communication terminal apparatuses 100-1, 100-2, and 100-3 each employ the configuration of the communication terminal apparatus 100 illustrated in FIG. 1. An SIP server 201 is connected to a local IP network 203.

In this connection environment, for example, the communication terminal apparatus 100-1 can communicate with the communication terminal apparatus 100-2 over the local IP network 203 via the SIP server 201, as indicated by 211 in FIG. 2A (a first communication mode). The communication terminal apparatus 100-1 can also communicate with the communication terminal apparatus 100-3 over a public IP network 205 and an HGW (home gateway) 2 (202-2) via an HGW1 (201-1), as indicated by 212 in FIG. 2A. Furthermore, the communication terminal apparatus 100-1 can communicate with an analog fax apparatus 207 via a telephone public line network 204, as indicated by 213 in FIG. 2A (a second communication mode).

It is necessary for a user to understand whether a given partner can be called over the local IP network 203 via the SIP server (211), over the public IP network 205 via the HGW (212), or over the telephone public line network 204 (213). However, whether or not a partner can be called over an IP network and whether or not a partner can be called over a telephone public line network cannot be determined using only that partner's telephone number (a destination number). Thus a method is conceivable in which an administrator registers telephone number prefixes in association with the communication modes from 211 to 213 in advance, and a partner telephone number input by a user is compared with the telephone number prefixes in the registered list and the partner is then called through the matching communication mode.

However, there are cases where errors in communication over the IP network occur even when using such a method. For example, as shown in FIG. 2B, there are cases where a user wishes to communicate with the analog fax apparatus 207 but is unaware that the partner device is an analog fax apparatus, and thus attempts the call over the public IP network. Accordingly, the communication terminal apparatus according to the present invention solves such a problem by executing control such as that described below.

Software Configuration of Communication Terminal Apparatus

Next, a software configuration for executing applications in the communication terminal apparatus 100 according to the present embodiment will be described with reference to FIG. 3. The software configuration of the communication terminal apparatus 100 includes a job control unit 301, a communication management unit 302, a line control unit 303, a communication control (T.30) unit 304, and a protocol stack 305.

When an operation for transmitting a facsimile is made through the operating unit 117, the job control unit 301 generates a fax transmission job and notifies the communication management unit 302 of the generated fax transmission job. The communication management unit 302 requests the line control unit 303 to execute call processing using job information, including partner information such as the partner's telephone number, a communication mode, and so on, provided by the job control unit 301.

G3 facsimile transmission will be carried out in the case where the communication mode uses the telephone public line network, and thus the line control unit 303 instructs the modem/NCU 109 to execute dialing operations. When the call is completed and a connection is established with the partner, the communication management unit 302 launches the communication control unit 304, the communication control unit 304 controls the modem/NCU 109 according to the T.30 protocol, and the G3 facsimile communication is executed.

On the other hand, in the case where the communication mode is communication over the local IP network via the SIP server, the public IP network via the HGW, or the public telephone network, IP facsimile transmission is executed using SIP and the T.38 protocol. Accordingly, the line control unit 303 notifies the protocol stack 305 so that the partner is connected to using the SIP protocol. An SIP message created by the protocol stack is transmitted to the LAN 113 via the LAN I/F 112. When a session with the partner is started using the SIP protocol, the communication control unit 304 executes a real-time Internet facsimile procedure with the partner communication terminal apparatus using T.38. T.38 is a transmission control protocol for realizing G3 facsimile communication in real time over an IP network. Thus as described thus far, the communication terminal apparatus 100 according to the present embodiment can use a plurality of communication modes.

Screen Examples

Figure 4A:
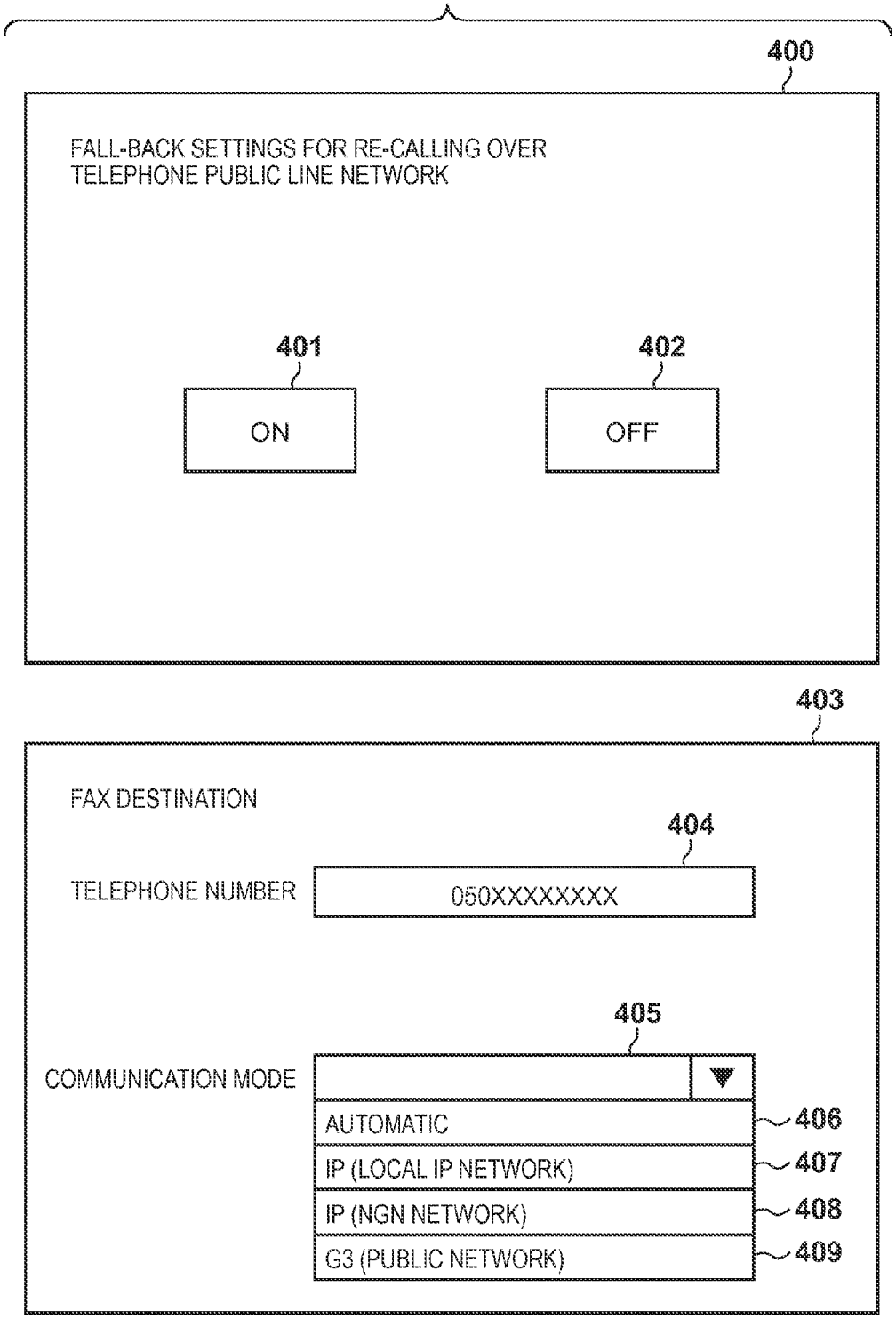
FIG. 4A is a diagram illustrating a settings screen in the communication terminal apparatus 100 according to the embodiment.

Next, examples of screens displayed in the operating unit 117 of the communication terminal apparatus 100 will be described with reference to FIGS. 4A and 4B. 400 in FIG. 4A is an example of a screen through which whether or not to execute fall-back processing for re-calling over a telephone public line network can be set for the communication terminal apparatus according to a working example of the present invention. When an on button 401 in the fall-back settings screen 400 is pressed using the operating unit 117, for re-calling over the telephone public line network, fall-back processing for re-calling over the telephone public line network is activated; when an off button 402 is pressed, the fall-back processing is deactivated.

403 in FIG. 4A is an example of a screen in which a user of the communication terminal apparatus 100 according to the present embodiment inputs a communication mode to be set for a partner and the telephone number of the partner. In the fax destination screen 403, the telephone number of the partner can be input in 404 using the operating unit 117. Furthermore, automatic 406, IP (local IP network via SIP server) 407, IP (NGN network via HGW) 408, or G3 (telephone public line network) 409 can be selected using a communication mode pull-down menu 405.

410 and 413 in FIG. 4B are examples of screens for registering a list that associates communication modes set by the user of the communication terminal apparatus 100 with telephone number prefixes, according to the present embodiment. A telephone number prefix 411 and a communication mode 412 can be registered in the communication mode and telephone number prefix registration screen 410 using the operating unit 117, and upon being registered, these items are displayed in a list 414 in the communication mode registration list screen 413.

Processing Flow

Figure 5:
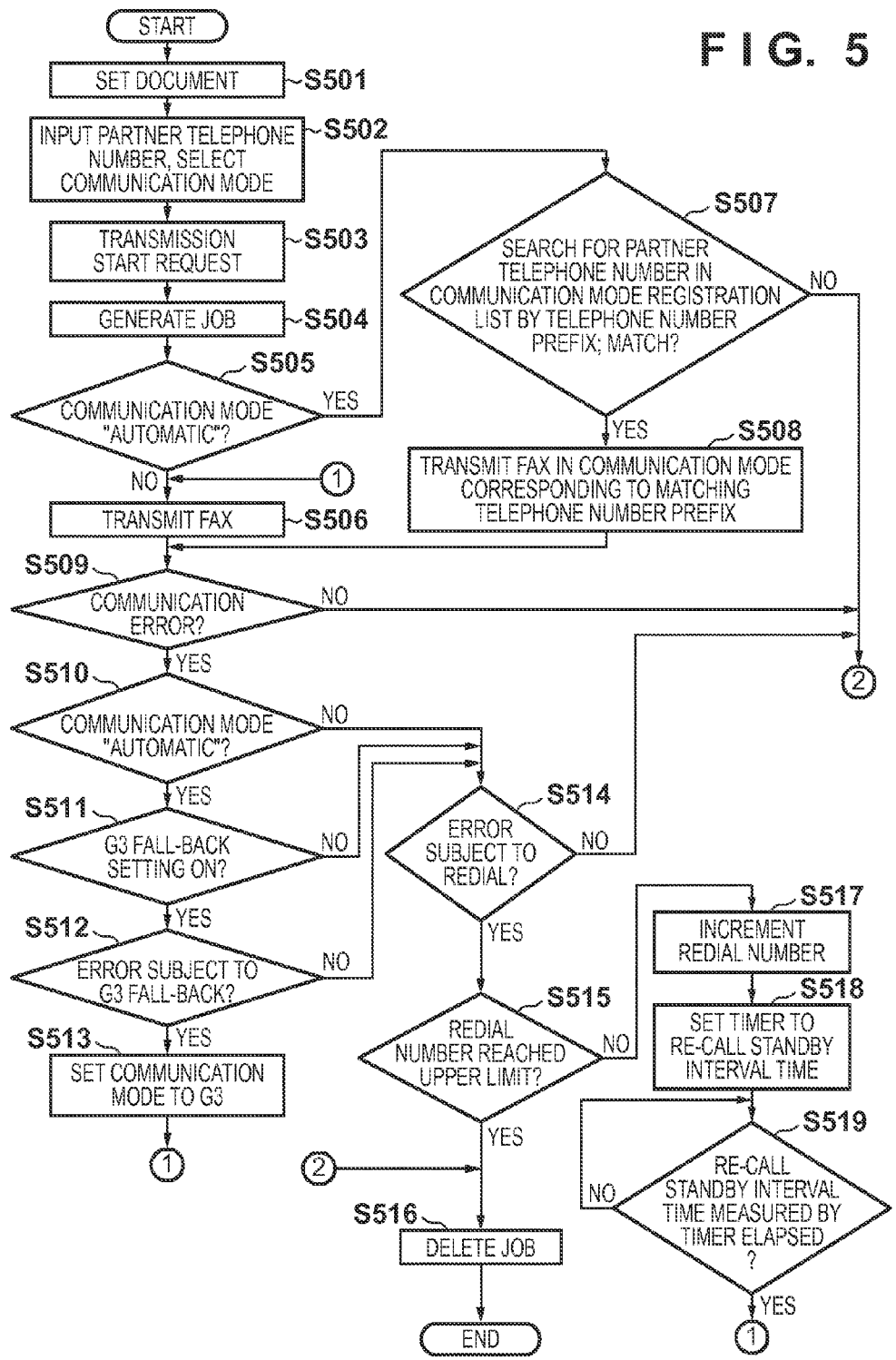
FIG. 5 is a flowchart illustrating call control operations performed by the communication terminal apparatus 100 according to the embodiment.

Next, call control operations performed by the communication terminal apparatus 100 according to the present embodiment will be described with reference to FIG. 5. The processes described hereinafter are realized by the CPU 101 of the communication terminal apparatus 100 reading out programs stored in a memory such as the ROM 102 into the RAM 103 and executing those programs. Note that the processes described hereinafter correspond to the operations performed by the communication terminal apparatus 100-1 illustrated in FIG. 2A.

In S501, a document to be transmitted is set in the scanner 116 of the communication terminal apparatus 100-1 by a user. The process advances to S502 upon the CPU 101 detecting that the document to be transmitted has been placed in the scanner 116 using a sensor provided in a tray on which the document to be transmitted is placed. In S502, the CPU 101 selects a partner telephone number and a communication mode (local IP network via SIP server, public IP network via HGW, public telephone network, automatic) in the fax destination screen 403 in accordance with user instructions made through a numerical keypad or the like in the operating unit 117. In S503, when a facsimile transmission operation has been made using the operating unit 117, the CPU 101 generates a fax transmission job from the partner telephone number and the communication mode information using the job control unit 301, and notifies the communication management unit 302 of the job generated in S504.

Next, in S505, the CPU 101 determines whether or not the communication mode is set to "automatic". The process advances to S507 in the case where the communication mode is set to "automatic", whereas the process advances to S506 in the case where the communication mode is not set to "automatic", or in other words, is set to a specific communication mode. In S507, the CPU 101 searches for the partner number using the telephone number prefix registered in the communication mode registration list, and determines whether or not a matching telephone number is present. The process advances to S508 when a matching telephone number is present, and advances to S516 when a matching telephone number is not present. In S508, the CPU 101 requests the line control unit 303 to carry out call processing using the communication mode corresponding to the matching telephone number prefix and the fax transmission job information for the partner telephone number provided by the job control unit 301, after which the process advances to S509.

Meanwhile, when it is determined in S505 that the communication mode is not "automatic", the process advances to S506, where the CPU 101 requests the line control unit 303 to carry out call processing using the fax transmission job information such as the partner telephone number and communication mode provided by the job control unit 301, after which the process advances to S509.

When the call processing is requested in S506 or S508, the line control unit 303 takes the partner information as a transmission destination, and notifies the protocol stack 305 that, for example, a connection is to be made with the HGW 202-1 using the SIP protocol. An SIP message created by the protocol stack 305 is transmitted to the LAN 113 via the LAN I/F 112, and an INVITE is transmitted to the HGW 202-1. Furthermore, the line control unit 303 monitors whether or not a response code has been received after the INVITE has been transmitted, and when a response code sent by the HGW 202-1 is received, the line control unit 303 provides the response code to the communication management unit 302. The communication management unit 302 analyzes the response code.

In S509, the CPU 101 determines whether or not a communication error has occurred based on the response code. The CPU 101 determines that a communication error has not occurred if the response code is 200OK (a normal response), and the line control unit 303 transmits an ACK for the protocol stack 305 using the SIP protocol, to the HGW 202-1. Upon receiving the ACK, the HGW 202-1 transfers the ACK to the HGW 202-2 via the NGN network 204. The HGW 202-2 transfers the ACK to the communication terminal apparatus 100-3. The communication terminal apparatus 100-3 receives the ACK. This establishes a session between the communication terminal apparatus 100-1 and the communication terminal apparatus 100-3. Next, the line control unit 303 transmits facsimile data to the communication terminal apparatus 100-3 using the T.38 protocol, via the HGW 202-1, the NGN network 204, and the HGW 202-2.

On the other hand, in the case where the response code is not 200OK, or in other words, in the case where a communication error has occurred, the process advances to S510. In S510, the communication management unit 302 determines whether or not communication mode is set to "automatic". In the case where the communication mode information does not indicate "automatic", it is determined that the current communication mode is the user's desired communication mode, and the process advances to S514. On the other hand, in the case where the communication mode is "automatic", it is determined that the user has no particular communication mode preference, and the process advances to S511.

In S511, the communication management unit 302 determines whether or not the fall-back setting for re-calling over the telephone public line network is set to "on". Specifically, this determination is carried out by reading out a setting for falling back on the telephone public line network from the RAM 103. In the case where the fall-back setting for re-calling over the telephone public line network is "off", the process advances to S514, whereas in the case where the fall-back setting for re-calling over the telephone public line network is "on", the process advances to S512.

In S512, the communication management unit 302 determines whether or not the error indicated by the received response code is subject to the fall-back processing. In the case where the error is subject to the fall-back processing, the process advances to S513, whereas in the case where the error is not subject to the fall-back processing, the process advances to S514. An error that is subject to the fall-back processing is an error issued in the case where it is highly likely that communication cannot be restored over the NGN network 204 even if re-calling is attempted after waiting for some time. "404 Not Found" or the like can be given as an example. "404 Not Found" is an error issued in the case where the partner communication terminal apparatus is not connected to the NGN network 204. In S513, the communication management unit 302 sets (changes) the communication mode to "telephone public line network", after which the process advances to S506.

On the other hand, in S514, the communication management unit 302 determines whether or not the error that has occurred is subject to re-calling processing (redial processing). This determination is carried out by analyzing the communication error based on the response received from the NGN network 204 or the communication terminal apparatus 100. An error subject to re-calling processing is an error occurring when communication cannot be carried out temporarily, and is an error issued in the case where it is highly likely that communication will succeed over the NGN network 204 if re-calling is executed after waiting for some time. "486 Busy Here", "480 Temporarily Unavailable", or the like are examples of such an error. "486 Busy Here" is an error issued in the case where the partner is busy. "480 Temporarily Unavailable" occurs in the case where the partner communication terminal apparatus 100-3 cannot receive a fax due to insufficient memory, no toner, or the like. In the case where the error is subject to the re-calling processing, the process advances to S516, whereas in the case where the error is not subject to the re-calling processing, the process advances to S515.

In S515, the CPU 101 functions as a number determination unit, and determines whether or not a number of re-calls (a number of executions) has reached a re-call upper limit number (a predetermined number). In the case where it has been determined that the upper limit number has been reached, the process advances to S516. On the other hand, in the case where it has been determined in S515 that the re-call number has not reached the re-call upper limit number, the process advances to S517. In S517, the communication management unit 302 increments the re-call number stored in the RAM 103, after which the process advances to S518. In S518, the communication management unit 302 sets the fax job to "re-call" and sets a timer to a re-call standby interval time, after which the process advances to S519. In S519, the communication management unit 302 monitors whether or not the timer has passed the re-call standby interval time, and the process advances to S506 in the case where the timer has passed that interval. That is, here, the facsimile transmission is executed without changing the communication mode, or in other words, using the same communication mode.

In S516, the job control unit 301 deletes the fax job and terminates the flow. In other words, here, the communication process ends successfully, or the communication process is terminated without executing the re-calling processing. Note that the CPU 101 functions as a retry control unit in the processing from S509 to S519.

As described above, the communication terminal apparatus according to the present embodiment executes communication with an external device using a plurality of communication modes that employ different networks. Specifically, the communication terminal apparatus selects a communication mode in accordance with a user instruction, and executes call processing over the network corresponding to the selected communication mode. When an error occurs during the call processing, the communication terminal apparatus determines the communication mode to be used in re-calling processing based on the user instruction already accepted and the cause of the error, and executes the communication. Thus according to the present invention, when executing re-calling processing due to the occurrence of a communication error, the communication mode can be determined in accordance with a user instruction, and thus the communication mode can be selected in accordance with the user's preferences to the greatest extent possible.

Note that the present invention is not limited to the aforementioned embodiment, and many variations can be carried out thereon. For example, an error determination unit that determines, based on the details of an error, whether or not to return to a state in which communication is possible after a predetermined amount of time has elapsed following the occurrence of the error, may further be provided. In this case, the communication terminal apparatus changes the communication mode and executes the re-calling processing in the case where the error determination unit has determined not to return to a state in which communication is possible after the predetermined amount of time has elapsed. On the other hand, the communication terminal apparatus may execute the re-calling processing without changing the communication mode in the case where the error determination unit has determined to return to a state in which communication is possible after the predetermined amount of time has elapsed.

Other Embodiments

Embodiments of the present invention can also be realized by a computer of a system or apparatus that reads out and executes computer executable instructions recorded on a storage medium (e.g., non-transitory computer-readable storage medium) to perform the functions of the above-described embodiment of the present invention, and by a method performed by the computer of the system or apparatus by, for example, reading out and executing the computer executable instructions from the storage medium to perform the functions of the above-described embodiment. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2013-074861 filed on Mar. 29, 2013, which is hereby incorporated by reference herein in its entirety.

What is claimed is:

1. A facsimile apparatus having a first interface that connects to an IP network and a second interface that connects to an analog network, the apparatus comprising:
   a selection unit configured to automatically select a communication mode to be used from among a plurality of communication modes for transmission using the first interface;
   a transmission unit configured to execute facsimile transmission using the communication mode automatically selected by the selection unit in the case where an instruction has been made to automatically select the communication mode to be used and to execute facsimile transmission using a manually-selected communication mode in the case where one of the plurality of communication modes has been manually selected; and
   a control unit responsive to failure of facsimile transmission using the first interface, the control unit being configured to control execution or non-execution of re-transmission using the second interface such that (a) re-transmission using the second interface is executed in a case where the communication mode used in the facsimile transmission is the communication mode automatically selected by the selection unit and a fallback setting is valid, (b) re-transmission using the second interface is not executed in a case where the communication mode used in the facsimile transmission is the communication mode automatically selected by the selection unit and the fallback setting is invalid, and (c) re-transmission using the second interface is not executed, regardless of whether the fallback setting is valid or invalid, in a case where the communication mode used in the facsimile transmission is the manually-selected communication mode.

2. The facsimile apparatus according to claim 1, further comprising:
   a determination unit configured to determine whether or not to execute re-transmission using the second interface when the facsimile transmission using the first interface has failed and the communication mode used in the facsimile transmission is the communication mode automatically selected by the selection unit.

3. The facsimile apparatus according to claim 2,
   wherein the determination unit executes the determination based on error details of the failed facsimile transmission.

4. The facsimile apparatus according to claim 1, further comprising:

an input unit configured to input a telephone number of a partner,
wherein the selection unit executes the automatic selection based on at least part of the telephone number input by the input unit.

5. The facsimile apparatus according to claim 1, further comprising:
a reading unit configured to read an image on a document and generate image data,
wherein the transmission unit transmits the image data generated by the reading unit.

6. A facsimile apparatus having a first interface that connects to an IP network and a second interface that connects to an analog network, the apparatus comprising:
an acceptance unit configured to accept, from a user, an instruction for selecting a communication mode to be used from among a plurality of communication modes for transmission using the first interface;
a transmission unit configured to execute facsimile transmission using the communication mode selected in accordance with the instruction accepted by the acceptance unit; and
a control unit responsive to failure of facsimile transmission using the first interface the control unit being configured to control execution or non-execution of re-transmission using the second interface such that (a) re-transmission using the second interface is executed in a case where the communication mode used in the facsimile transmission is a communication mode selected in accordance with a first instruction accepted by the acceptance unit and a fallback setting is valid, (b) re-transmission using the second interface is not executed in a case where the communication mode used in the facsimile transmission is a communication mode selected in accordance with a first instruction accepted by the acceptance unit and the fallback setting is invalid, and (c) re-transmission using the second interface is not executed, regardless of whether the fallback setting is valid or invalid, in a case where the communication mode used in the facsimile transmission is a communication mode selected in accordance with a second instruction accepted by the acceptance unit.

7. The facsimile apparatus according to claim 6,
wherein the first instruction is an instruction for automatically selecting the communication mode and the second instruction is an instruction for manually selecting the communication mode.

8. A control method for a facsimile apparatus having a first interface that connects to an IP network and a second interface that connects to an analog network, the method comprising:
automatically selecting a communication mode to be used from among a plurality of communication modes for transmission using the first interface;
executing facsimile transmission using the communication mode automatically selected in the step of selecting in the case where an instruction has been made to automatically select the communication mode to be used and executing facsimile transmission using a manually-selected communication mode in the case where one of the plurality of communication modes has been manually selected; and
controlling, execution or non-execution of re-transmission using the second interface responsive to failure of facsimile transmission using the first interface, wherein (a) re-transmission using the second interface is executed in a case where the communication mode used in the facsimile transmission is the communication mode automatically selected in the step of selecting and a fallback setting is valid, (b) re-transmission using the second interface is not executed in a case where the communication mode used in the facsimile transmission is the communication mode automatically selected in the step of selecting and the fallback setting is invalid, and (c) re-transmission using the second interface is not executed, regardless of whether the fallback setting is valid or invalid, in a case where the communication mode used in the facsimile transmission is the manually-selected communication mode.

9. A non-transitory computer-readable storage medium storing a computer program that causes a computer to execute the steps of the control method for a facsimile apparatus according to claim 8.

10. A control method for a facsimile apparatus having a first interface that connects to an IP network and a second interface that connects to an analog network, the method comprising:
accepting, from a user, an instruction for selecting a communication mode to be used from among a plurality of communication modes for transmission using the first interface;
executing facsimile transmission using the communication mode selected in accordance with the instruction accepted in the accepting step; and
controlling, execution or non-execution of re-transmission using the second interface responsive to failure of facsimile transmission using the first interface, wherein (a) re-transmission using the second interface is executed in a case where the communication mode used in the facsimile transmission is a communication mode selected in accordance with a first instruction accepted in the accepting step and a fallback setting is valid, (b) re-transmission using the second interface is not executed in a case where the communication mode used in the facsimile transmission is a communication mode selected in accordance with a first instruction accepted in the accepting step and the fallback setting is invalid, and (c) re-transmission using the second interface is not executed, regardless of whether the fallback setting is valid or invalid, in a case where the communication mode used in the facsimile transmission is a communication mode selected in accordance with a second instruction accepted in the accepting step.

11. A non-transitory computer-readable storage medium storing a computer program that causes a computer to execute the steps of the control method for a facsimile apparatus according to claim 10.

* * * * *